United States Patent
Sung et al.

(10) Patent No.: US 11,376,963 B2
(45) Date of Patent: Jul. 5, 2022

(54) USER INTERFACE GENERATING APPARATUS AND METHOD FOR VEHICLE

(71) Applicants: Hyundai Motor Company, Seoul (KR); Kia Motors Corporation, Seoul (KR)

(72) Inventors: Tae Hyun Sung, Seoul (KR); Bum Hee Chung, Seoul (KR); Paul Choo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 77 days.

(21) Appl. No.: 17/010,357

(22) Filed: Sep. 2, 2020

(65) Prior Publication Data

US 2021/0331588 A1     Oct. 28, 2021

(30) Foreign Application Priority Data

Apr. 23, 2020    (KR) .................. 10-2020-0049540

(51) Int. Cl.
    *B60K 35/00*     (2006.01)
    *G06K 9/00*     (2022.01)
    *G06V 20/56*     (2022.01)

(52) U.S. Cl.
    CPC ............ *B60K 35/00* (2013.01); *G06V 20/56* (2022.01); *B60K 2370/1529* (2019.05);
(Continued)

(58) Field of Classification Search
    CPC ............ B60K 35/00; B60K 2370/1529; B60K 2370/167; B60K 2370/177; B60K 2370/178; B60K 2370/179; G06V 20/56
    See application file for complete search history.

(56) References Cited

U.S. PATENT DOCUMENTS 8,081,794 B2 * 12/2011 Stiegler ................. G06T 7/20
                                                          382/100
8,098,171 B1 * 1/2012 Szczerba .............. G08G 1/166
                                                          340/905
(Continued)

FOREIGN PATENT DOCUMENTS

DE           4214323 A1 * 11/1992 ............... G01P 1/08
WO   WO-2018172886 A1 * 9/2018 ......... G01C 21/3658

OTHER PUBLICATIONS

"The mode setting of the Genesis GV 80 navigation includes the neon view mode", <https://cafe.naver.com/dsdawdw/174006>.

(Continued)

*Primary Examiner* — Chico A Foxx
(74) *Attorney, Agent, or Firm* — Fox Rothschild LLP

(57) ABSTRACT

A user interface (UI) generating apparatus includes: an object recognition device configured to photograph a front or surroundings of a moving device and to recognize a real object from a photographed image; an image generator configured to create a virtual object for driving guidance of the moving device to generate an augmented real image obtained by composing the virtual object with the photographed image; and a display device configured to display the augmented reality image, wherein the image generator creates a virtual object that is changed in conjunction with a speed of the moving device, and creates a reinforcement virtual object capable of compensating the real object based on characteristics of the real object.

24 Claims, 11 Drawing Sheets

Conventional Art

Example

(52) U.S. Cl.
CPC .. *B60K 2370/167* (2019.05); *B60K 2370/177* (2019.05); *B60K 2370/178* (2019.05); *B60K 2370/179* (2019.05)

(56) References Cited

U.S. PATENT DOCUMENTS

| | | | | |
|---|---|---|---|---|
| 8,244,460 | B2* | 8/2012 | Kubota | G01C 21/3697 |
| | | | | 701/408 |
| 8,317,329 | B2* | 11/2012 | Seder | G08G 1/168 |
| | | | | 353/13 |
| 8,384,531 | B2* | 2/2013 | Szczerba | G01S 13/931 |
| | | | | 340/435 |
| 9,318,018 | B2* | 4/2016 | Park | H04N 5/44504 |
| 9,551,867 | B1* | 1/2017 | Grabowski | G02B 27/01 |
| 11,221,495 | B2* | 1/2022 | Svensson | G02B 27/0179 |
| 2010/0253493 | A1* | 10/2010 | Szczerba | G01S 13/723 |
| | | | | 340/435 |
| 2010/0253540 | A1* | 10/2010 | Seder | G01S 13/867 |
| | | | | 340/905 |
| 2012/0310499 | A1* | 12/2012 | Kiefer | F16H 61/0213 |
| | | | | 701/65 |
| 2013/0293582 | A1* | 11/2013 | Ng-Thow-Hing | G01C 21/365 |
| | | | | 345/633 |
| 2014/0107911 | A1* | 4/2014 | Park | G08G 1/00 |
| | | | | 701/119 |
| 2014/0145931 | A1* | 5/2014 | Kim | B60K 37/06 |
| | | | | 345/156 |
| 2014/0267398 | A1* | 9/2014 | Beckwith | G08G 1/166 |
| | | | | 345/633 |
| 2015/0291160 | A1* | 10/2015 | Kim | G06F 3/011 |
| | | | | 345/633 |
| 2016/0059697 | A1* | 3/2016 | Ann | B60W 30/14 |
| | | | | 701/96 |
| 2016/0163108 | A1* | 6/2016 | Kim | G06F 3/013 |
| | | | | 345/633 |
| 2017/0187963 | A1* | 6/2017 | Lee | H04N 5/23218 |
| 2017/0241795 | A1* | 8/2017 | Ko | G06T 19/006 |
| 2018/0066956 | A1* | 3/2018 | Kim | G01C 21/3682 |
| 2018/0232956 | A1* | 8/2018 | Jan Wyszka | G06F 3/011 |
| 2019/0034731 | A1* | 1/2019 | Lee | G06K 9/00671 |
| 2019/0077417 | A1* | 3/2019 | Kleen | B60W 50/14 |
| 2019/0129170 | A1* | 5/2019 | Matsuzaki | G02B 27/0101 |
| 2019/0295508 | A1* | 9/2019 | Tsuji | G02B 27/646 |
| 2019/0359228 | A1* | 11/2019 | Banno | B60W 40/072 |

OTHER PUBLICATIONS

"The Genesis GV80, equipped with advance IT such as an augmented reality navigation system", <https://www.ebn.co.kr/news/view/1008255>.

\* cited by examiner

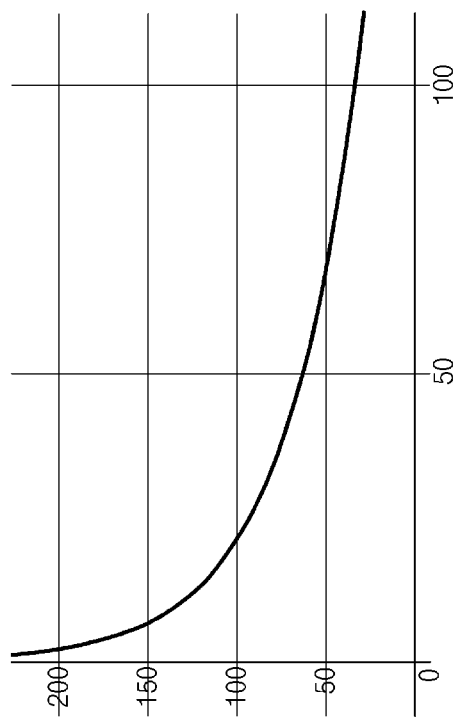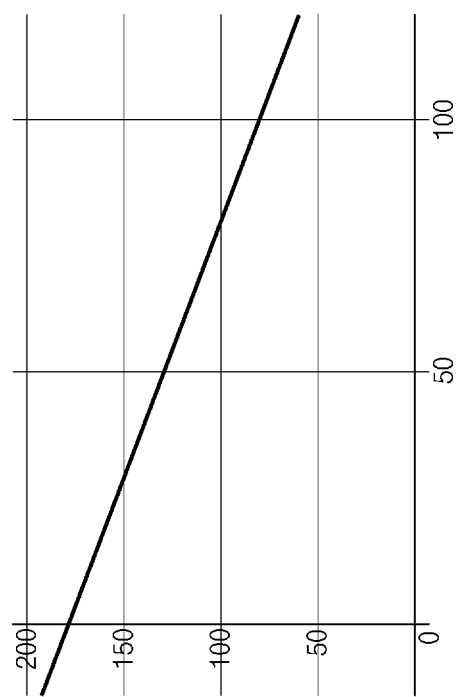
FIG. 4

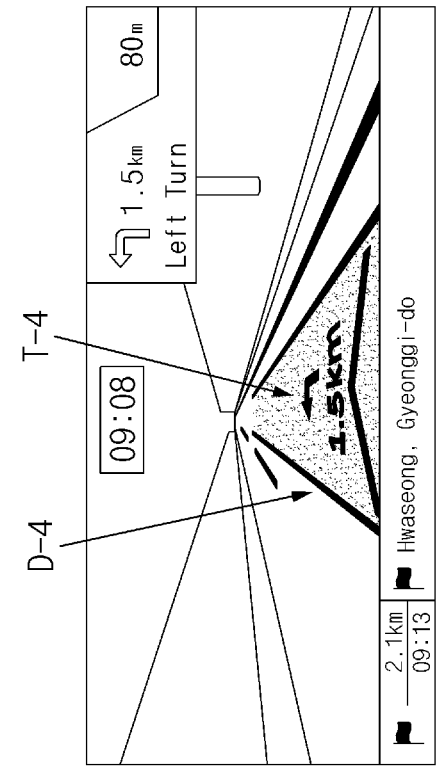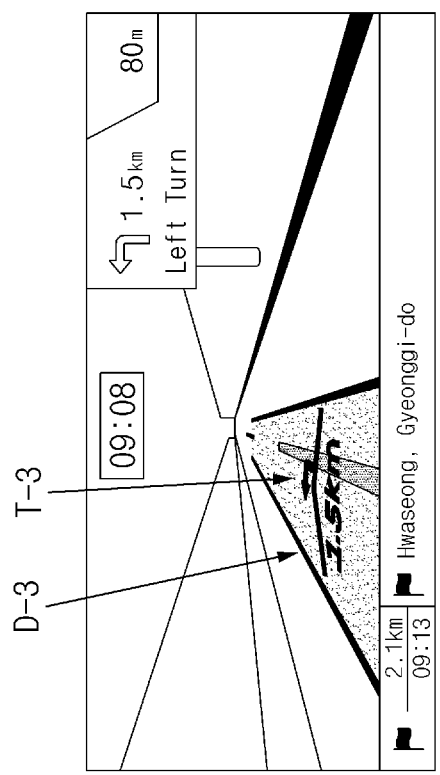
FIG. 7

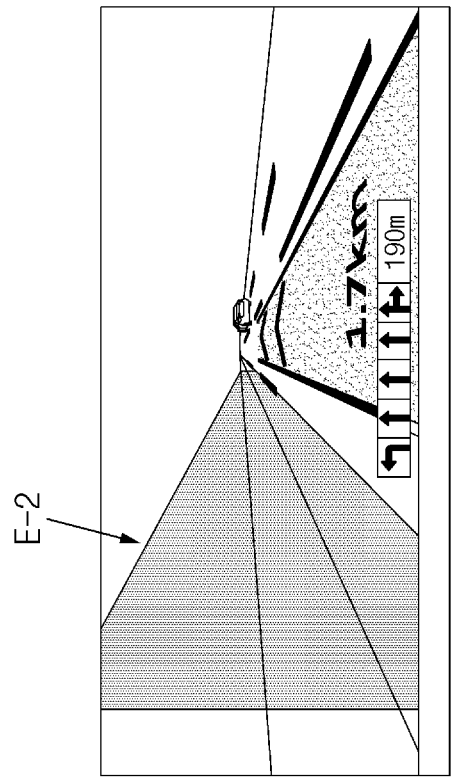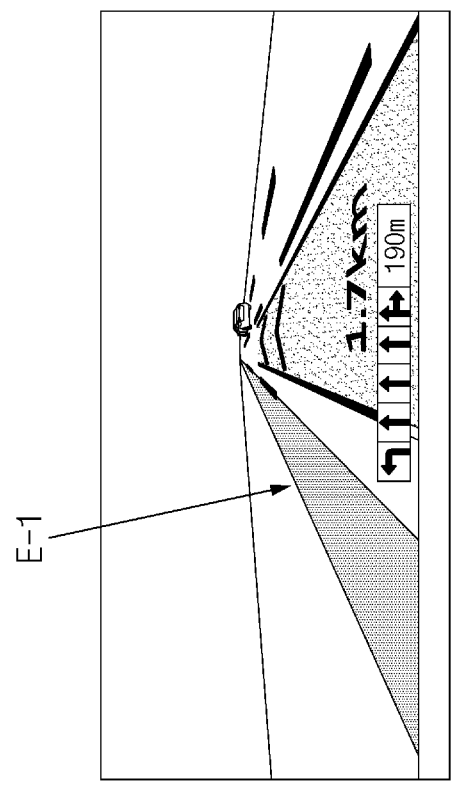
FIG. 8

USER INTERFACE GENERATING APPARATUS AND METHOD FOR VEHICLE

CROSS-REFERENCE TO RELATED APPLICATION

This application claims under 35 U.S.C. § 119(a) the benefit of Korean Patent Application No. 10-2020-0049540, filed in the Korean Intellectual Property Office on Apr. 23, 2020, the entire contents of which are incorporated herein by reference.

BACKGROUND

(a) Technical Field

The present disclosure relates to a user interface (UI) generating apparatus and a UI generating method, more particularly, to the UI generating apparatus and the UI generating method for a vehicle using augmented reality.

(b) Description of the Related Art

Augmented reality is a function that promotes user convenience by displaying separately constructed virtual objects on a real world. For example, augmented reality, currently used as a user interface (UI) or user experience (UX) for vehicle control or vehicle users, includes a technique for displaying carpets in the real world, a technique for displaying a vehicle departure warning in the real world with augmented reality, a technique for displaying vehicle and surrounding information with augmented reality, and a technique for generating a virtual object based on information recognized in the real world with augmented reality.

However, in augmented reality that projects a virtual object on the real world, heterogeneity often occurs due to differences in display locations and differences in object characteristics. In addition, when the virtual object is related to the properties of a real object, it is difficult to escape the properties of the real object. For example, in the case of displaying a surrounding image, when a change of the image is not large, it is difficult to check whether a virtual object is normally displayed (e.g., a straight section with no vehicles therearound), and in the case of displaying the surrounding image, it is difficult to feel a sense of speed of a moving device on board due to reasons such as perspective or the like. In addition, in the case of a high speed, too many objects are displayed in a short time, making it difficult to perceive the speed, or conversely, in the case of a low speed, too few objects are displayed at the same time, so there is a case where information itself is insufficient to feel the speed.

In addition, since augmented reality is provided to display a virtual object on a real world, the virtual object often invades an object in the real world. In this case, heterogeneity is often felt due to a perspective or overlapping phenomenon. In addition, when various objects are displayed, unnecessary overlapping phenomenon may occur in the case where display locations between the respective objects are not interconnected, or visibility may be deteriorated in the case where the overlapping phenomenon occurs in a form that is difficult for a user to recognize. In addition, when the object in the real world is emphasized and displayed, it is also inappropriate as a user UI in the case where it is limited to the characteristics of the object and simply provides a level of color highlighting. In addition, since object recognition is not performed in all situations, in most cases, an object interconnected with a location of the object in the real world often causes a display change rapidly depending on a recognition rate.

Therefore, there is a need for a technique capable of compensating for a decline in a user's cognition or a feeling of heterogeneity when augmented reality is displayed. The above information disclosed in this Background section is only for enhancement of understanding of the background of the disclosure, and therefore it may contain information that does not form the prior art that is already known in this country to a person of ordinary skill in the art.

SUMMARY

An exemplary embodiment of the present disclosure provides a user interface (UI) generating apparatus and a UI generating method, which may compensate for a decline of a user's cognition or a feeling of heterogeneity when augmented reality is displayed.

An exemplary embodiment of the present disclosure also provides a UI generating apparatus and a UI generating method, which can minimize heterogeneity in displaying a current state and a sense of speed when augmented reality is displayed.

In addition, an embodiment of the present disclosure further provides a UI generating apparatus and a UI generating method, which can minimize a disparity in display between a real object and an augmented reality object.

An exemplary embodiment of the present disclosure further provides a UI generating apparatus and a UI generating method, which can maximize an emphasis effect on a real object and minimizing dependence on a recognition rate of the real object when augmented reality is displayed.

An exemplary embodiment of the present disclosure further provides a UI generating apparatus and a UI generating method, which can provide additional information beyond characteristics of a real object through a virtual object. An exemplary embodiment of the present disclosure provides a UI generating apparatus including: an object recognition device configured to photograph a front or surroundings of a moving device and to recognize a real object from a photographed image; an image generator configured to create a virtual object for driving guidance of the moving device and to generate an augmented real image by composing the virtual object with the photographed image; and a display device configured to display the augmented reality image, wherein the image generator creates a virtual object that is changed in conjunction with a speed of the moving device, and creates a reinforcement virtual object capable of compensating the real object based on characteristics of the real object.

The image generator may generate a speed arrow whose bending degree is changed based on a speed of the moving device as the virtual object, and In this case, the bending degree of the speed arrow may be increased as the speed increases.

The image generator may change the bending degree within a predetermined range of a highest angle to a lowest angle.

The image generator may adjust a changed amount of the bending degree based on a magnitude of a changed amount of the speed, and the variation of the bending degree may be increased as the variation of the speed is smaller.

The image generator may generate carpet information related to a forward direction of the moving device as a virtual object, and may generate the carpet information to not overlap a surrounding moving device based on location information of a surrounding moving device obtained from an auxiliary system.

The image generator may generate turn-by-turn information for guiding a rotation operation of the moving device as a virtual object, and may change display locations of the carpet information and the turn-by-turn information of the moving device.

The image generator may generate a virtual object having a wall form that it is not accessible for a lane in a corresponding entering direction when it enters a lane on a road that is impossible to enter or enters another lane without an entering indicator.

The image generator may add an animation effect to the virtual object having the wall form; and The image generator may change a size or color of the virtual object having the wall form depending on a degree of impossibility to enter.

The image generator may generate carpet information capable of compensating a lane based on steering angle information of the moving device as a reinforcement virtual object.

The object recognition device may not change front lane information of the moving device when a speed of the moving device is equal to or less than a predetermined threshold.

The image generator may generate a virtual object having a wall form, and moves the virtual object having the wall form in a direction of the moving device when a center of the moving device deviates a predetermined range from a center of a forward path of the moving device.

Another exemplary embodiment of the present disclosure provides a UI generating method including: photographing a front of a moving device; obtaining information related to a real object around the vehicle; recognizing a real object from a photographed image, creating a virtual object for driving guidance of the moving device, and generating an augmented real image by composing the virtual object with the photographed image; and displaying the augmented real image, wherein the generating of the image includes: creating a virtual object that is changed in conjunction with a speed of the moving device; and creating a reinforcement virtual object capable of compensating the real object based on characteristics of the real object.

Another exemplary embodiment of the present disclosure provides a UI generating apparatus including: an object recognition device configured to recognize a real object from a front or surroundings of a moving device; an image generator configured to generate a virtual object for driving guidance of the moving device based on the recognized real object, and to generate an augmented real image including the virtual object; a display device configured to display the augmented reality image, wherein the image generator creates a virtual object that is changed in conjunction with a speed of the moving device, and creates a reinforcement virtual object capable of compensating the real object based on characteristics of the real object, and the display device includes a transparent display area.

Another exemplary embodiment of the present disclosure provides a UI generating method including: recognizing a real object from a front or surroundings of a moving device; generating a virtual object for driving guidance of the moving device based on the recognized real object, and generate an augmented real image including the virtual object; displaying the augmented real image on a display device including a transparent display area; wherein the generating of the image includes: creating a virtual object that is changed in conjunction with a speed of the moving device; and creating a reinforcement virtual object capable of compensating the real object based on characteristics of the real object.

The present technique provides a UI generating apparatus and a UI generating method, capable of compensating for a decline of a user's cognition declines or a feeling of heterogeneity when augmented reality is displayed.

An exemplary embodiment of the present disclosure provides a UI generating apparatus and a UI generating method, capable of minimizing heterogeneity in displaying a current state and a sense of speed when augmented reality is displayed.

In addition, an embodiment of the present disclosure provides a UI generating apparatus and a UI generating method capable of minimizing the disparity in display between a real object and an augmented reality object.

An exemplary embodiment of the present disclosure also provides a UI generating apparatus and a UI generating method, capable of maximizing an emphasis effect on a real object and minimizing dependence on a recognition rate of the real object when augmented reality is displayed.

An exemplary embodiment of the present disclosure provides a UI generating apparatus and a UI generating method, capable of providing additional information beyond characteristics of a real object through a virtual object.

BRIEF DESCRIPTION OF THE DRAWINGS

FIG. 4 illustrates a view for describing a variation of a bending degree of a speed arrow according to an exemplary embodiment of the present disclosure.

FIG. 7 illustrates a view for describing carpet information and turn-by-turn information according to an exemplary embodiment of the present disclosure.

FIG. 8 illustrates a virtual object related to a road lane according to an exemplary embodiment of the present disclosure.

DETAILED DESCRIPTION OF THE EMBODIMENTS

Figure 1:
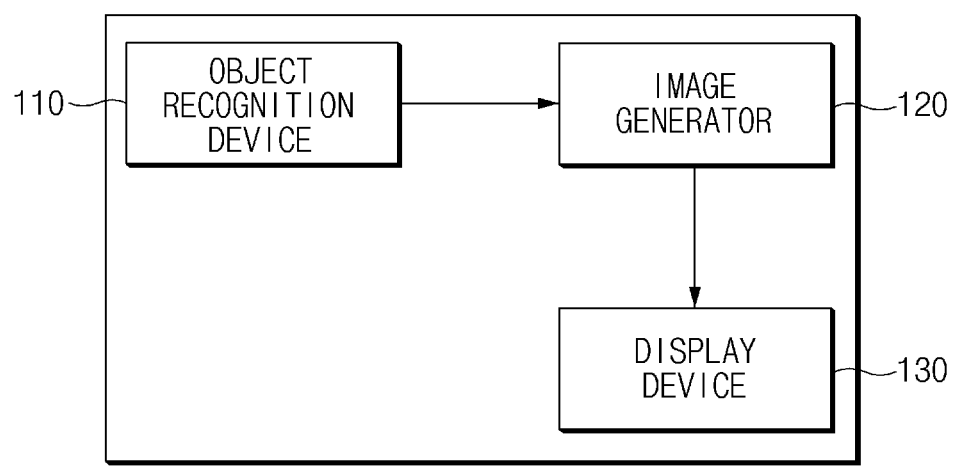
FIG. 1 illustrates a control block diagram of a UI generating apparatus according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present disclosure will be described in detail with reference to FIGS. 1 to 10.

FIG. 1 illustrates a control block diagram of a user interface (UI) interface generating apparatus according to an exemplary embodiment of the present disclosure.

The UI generating apparatus may be an apparatus including various modules installed in a moving device, or may be implemented as an external server that generates a UI for the moving device based on various information provided by the moving device and provides it to the moving device. The UI generating apparatus may further include a voice output device as well as a display device 130 to be described later as a user interface that guides a path to a moving device or provides additional information related to driving to a user. Such a UI generating apparatus may be implemented through an existing system that may be provided in a moving device, e.g., a navigation, a head up display (HUD), or a driver assistance system.

In addition, the UI generating apparatus may include various user input devices capable of receiving user input and selection. The user input devices may include a touch pad configured as part of the display device 130, or may be implemented as an input button, a microphone capable of receiving a user voice, or the like.

The UI generating apparatus according to the present disclosure displays a virtual object on the real world to generate an image based on augmented reality for user convenience and provides it to the user. In the case of existing augmented reality, problems include a feeling of decline of a user's cognition or a feeling of heterogeneity. The UI generating apparatus according to the present disclosure may increase a recognition rate of the augmented reality, may reduce a sense of heterogeneity, may increase a user recognition rate, and may create a reinforcement virtual object that could not be implemented by existing augmented reality.

To this end, the UI generating apparatus according to the present embodiment may include an object recognition device 110, an image generator 120, and a display device 130 as illustrated in FIG. 1.

The object recognition device 110 corresponds to an information receiver that receives information related to a moving device and objects around the moving device, the image generator 120 generates an augmented real image to be provided to the user, and the display device 130 displays the generated image and provides it to the user. According to an example, the moving device may include a vehicle or an unmanned air vehicle, and use of the vehicle is described as an example herein.

The object recognition device 110 may include a camera or an auxiliary system installed in the moving device to photograph a front or surroundings of the moving device, and a sensor device for sensing various information in the vehicle.

The camera may photograph the front of the moving device, and other moving device in front of the moving device, and a lane, a state of the road, and a real object on the road when the moving device is a vehicle. The camera may be a front camera for front photographing, or may further include a rear camera for acquiring a rear image of the moving device. When the head-up display is implemented in the moving device, the camera that photographs the front may be omitted.

The sensor device is configured to sense driving information of the moving device, and for example, in the case of a vehicle, may include a steering wheel, a gyro sensor, a speed sensor, and a steering angle sensor. The sensor device may provide information related to a moving device or information related to a real object around the moving device, necessary for generating a virtual object for augmented reality, to the image generator 120. Such a sensor device may be omitted depending on an example of UI generation according to this document.

The auxiliary system may also provide information related to the real object around the moving device, and in the present exemplary embodiment, the auxiliary system may include a cruise controller. The cruise controller, which is a controller for constant speed driving or automatic speed adjustment, may provide location information of a front moving device to the image generator 120.

Meanwhile, the object recognition device 110 may recognize a real object from a photographed image. For example, the object recognition device 110 may be implemented as an algorithm capable of recognizing the real object based on the photographed image and outputting the information, and may distinguish image and object information from the photographed image and output it.

The image generator 120 creates a virtual object for driving guidance of the moving device to generate an augmented real image by composing the virtual object with the photographed image. According to another example, the image generator 120 may generate an augmented real image including a virtual object without composition with the photographed image. Meanwhile, according to another example, the image generator 120 may recognize a real object from the photographed image.

According to an example, the real object may include surrounding vehicles, a road, a road sign, a lane, and the like of a driving vehicle.

The image generator 120 may include an image composition system that displays locations and shapes of virtual objects to be suitable for the real world. Alternatively, the image generator 120 may further include an object recognition system that recognizes objects in the real world. The object recognition system and the image composition system may be independent of each other, or may be merged into a single module.

Meanwhile, in the case where an object is recognized by the object recognition device 110 or the image generation device 120, when a speed of the moving device is equal to or less than a predetermined threshold, front lane information of the moving device may not be changed. For example, carpet information to be described later may continuously be shaken even though a front situation does not be changed when the moving device is driven at a low speed or is stopped. When there are a plurality of straight lines, such as a crosswalk, in front of the stopped moving device, recognition probability thereof may be changed, thereby causing a lane recognition defect. Therefore, in this case, that is, when a vehicle speed is equal to or less than a predetermined speed (e.g., 3 kph), it may be determined that the front situation has not changed as lane information is not updated, and the virtual object may not be subsequently changed.

The image generator 120 according to the present disclosure may create various virtual objects or reinforcement virtual objects for driving guidance of the moving device. The image generator 120 may create a virtual object that is changed in conjunction with a speed of the moving device, and may create a reinforced virtual object that can compensate the real object based on a characteristic of the real object. For example, a speed arrow indicating the speed of the moving device, carpet information related to a driving lane of the moving device, turn-by-turn information, and reinforcement virtual objects for reinforcing the lane may be created. These virtual objects are described below with reference to the drawings.

The display device 130 displays the augmented real image generated and composed by the image generator 120. As described above, a touch screen or a touch pad for user input may be implemented by being coupled to the display 130.

The display device 130 may be implemented as a navigation or a HUD, and as a specific example, an AR HUD including a transparent display area or a transparent display.

Alternatively, according to an example, the display device 130 may be implemented as an external device, e.g., glasses, that is not mounted on a moving device that implements augmented reality. In this case, the external display device may further include a communication deice capable of wirelessly communicating with the image generator 120 in the moving device.

According to an example, the image generator 120 may create a virtual object for a speed conjunction component and provide it to the user. The speed conjunction component may be a graphical user interface (GUI) that is changed based on a speed depending on the speed of the moving device, and may be implemented as, e.g., an arrow capable of indicating a faster direction depending on the speed.

Figure 2:
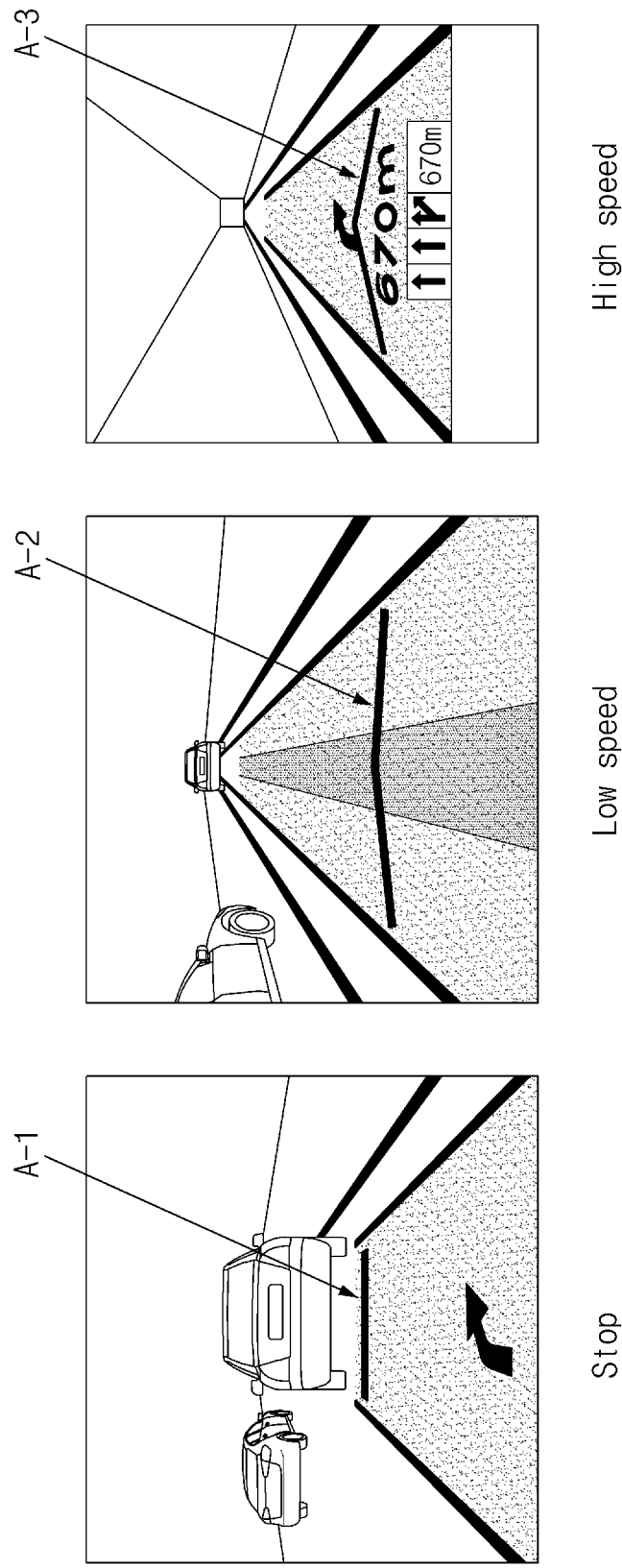
FIG. 2 illustrates a view for describing a speed arrow indicating a speed of a moving device according to an exemplary embodiment of the present disclosure.

FIG. 2 illustrates a view for describing a speed arrow indicating a speed of a moving device according to an exemplary embodiment of the present disclosure.

As illustrated in FIG. 2, the image generator 120 may create speed arrows A-1, A-2, and A-3 reflecting the speed of the moving device, and a bending degree of the speed arrow may be changed based on the speed of the moving device. The bending degree of the speed arrow may be increased as the speed increases.

When the moving device is stopped, the speed arrow A-1 may be an arrow close to a straight line with little bending, and the speed arrow A-3 in the case where the moving device is driven at a high speed may have a greater bending degree than that of the speed arrow A-2 in the case of a low speed.

When the speed arrow reflecting the speed is created as a virtual object, a user may intuitively obtain information related to a sense of speed. It is possible to compensate recognition of speed that is reduced as a GUI of a same type is always displayed in conventional arrangements.

In addition, according to an example, when creating and displaying a speed arrow, the image generator 120 may limit the bending degree to a certain level by setting a lower limit and an upper limit of the speed to prevent the speed arrow from being displayed heterogeneously and unnaturally. That is, the image generator 120 may change the bending degree of the speed arrow within a predetermined range of between a highest angle and a lowest angle.

Figure 3:
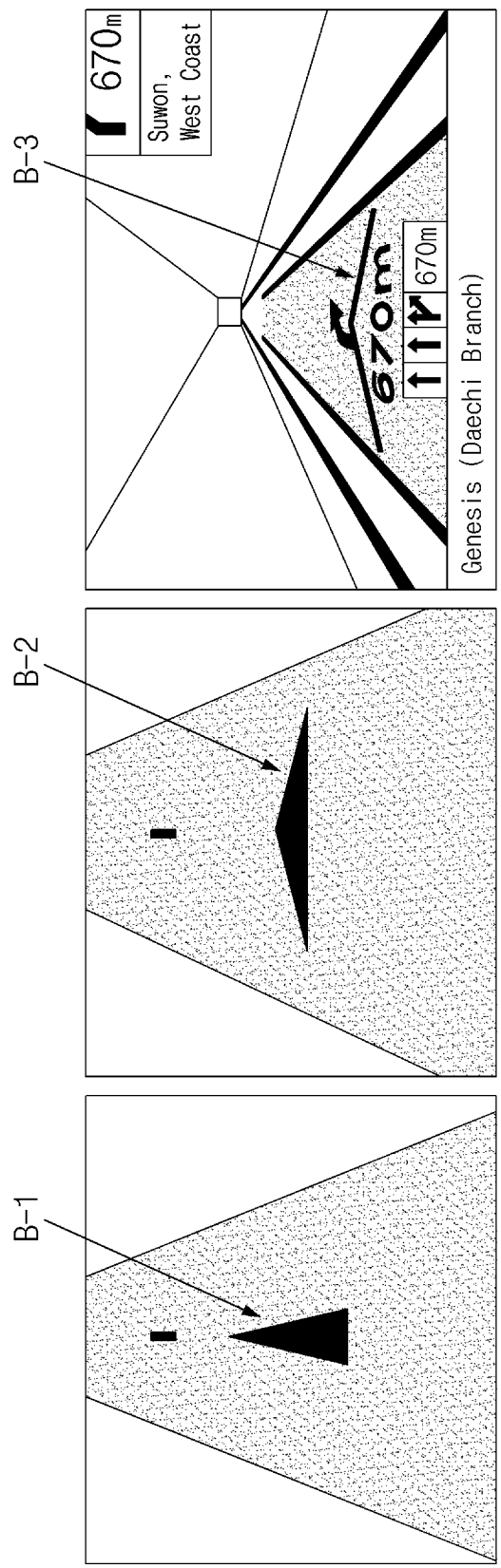
FIG. 3 illustrates a bending degree of a speed arrow according to an exemplary embodiment of the present disclosure.

FIG. 3 illustrates a bending degree of a speed arrow according to an exemplary embodiment of the present disclosure.

As illustrated in FIG. 3, the speed arrow B-1 according to an example may have excessive bending of the arrow when the speed of the moving device is high because there is no upper limit of the bending. In this case, the bending degree is simply proportional to the speed of the vehicle, and thus when the speed of the vehicle is very high, the speed arrow B-1 may be too sharp to escape a shape of the arrow, or the speed arrow B-1 displayed on the display device 130 may be unnatural.

Accordingly, the bending degree of the speed arrow B-2 according to an example may be changed within a predetermined range of between a highest angle and a lowest angle. When the speed arrow B-2 is changed in a certain limited range, it is possible to prevent the speed arrow from becoming excessively sharp. Accordingly, when the speed arrow B-3 is displayed on the display device 130, a user may visually recognize the speed arrow B-3 without being awkward even when the speed of the moving device is high.

In addition, the image generator 120 according to an example may reflect a constant bending rate depending on the speed when the speed arrow is generated, or may display an irregular bending rate, so that the user can easily sense a speed change.

That is, the image generator 120 may adjust a variation of the bending degree of the speed arrow based on a magnitude of a variation of the speed, and may increase the variation of the bending degree as the variation of the speed is small according to an example.

FIG. 4 illustrates a view for describing a variation of a bending degree of a speed arrow according to an exemplary embodiment of the present disclosure. FIG. 4 illustrates a graph showing a bending internal angle y of a speed arrow according to a speed x of a moving device, an internal angle of the speed arrow may be proportional to the speed of the moving device as in a first example (Example 1), and it may represent a non-direct proportional curved shape, e.g., an exponential function, as in a second example (Example 2).

The graph of the first example (Example 1) is expressed as follows, and in this case, when the moving device moves at a low speed, a changed degree of bending may be small, so that the user may have difficulty feeling about a speed change.

$$y=180-x \quad \text{[Equation 1]}$$

On the other hand, in the case of the low speed, when the changed degree of bending is increased, even though the moving device moves at the low speed, the user may intuitively sense a speed variation as in the second example (Example 2). When the graph of the second example (Example 2) is expressed as an equation, it can be expressed as Equation 2, and an internal angle of the speed arrow relative to the speed of the moving device may be expressed as an exponential function.

$$y=180-100 \log x \quad \text{[Equation 2]}$$

The user may be provided with a GUI that is changed depending on speed interconnection, and may intuitively obtain information related to a sense of speed through the speed arrow shown in FIGS. 2 to 4. In particular, when the moving device is driven at a high speed, it is possible to replace the display of too frequent speed information.

Meanwhile, according to an example, the image generator 120 may improve the visibility of the GUI by solving the overlap between the real object and the created virtual object.

Figure 5:
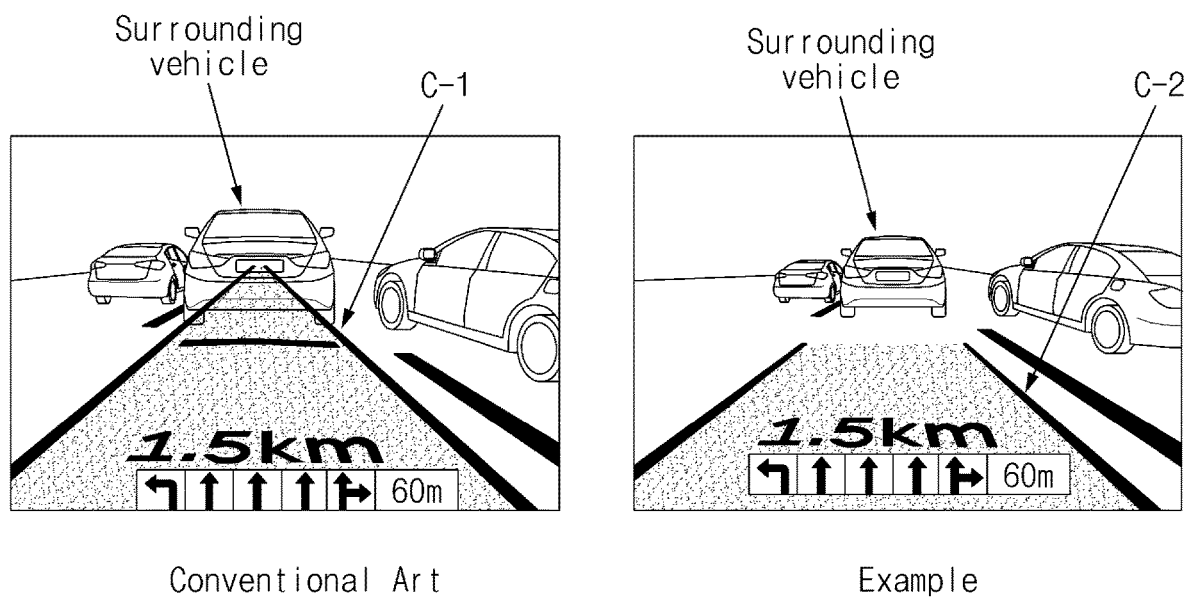
FIG. 5 illustrates a view for describing carpet information according to an exemplary embodiment of the present disclosure.

FIG. 5 illustrates a view for describing carpet information according to an exemplary embodiment of the present disclosure.

When an image depending on augmented reality is generated, carpet information related to a forward direction of the moving device may be generated as GUI information for driving guidance of the moving device. The image generator 120 according to the present exemplary embodiment may also generate carpet information including information related to speed and driving on a road, i.e., a driving lane, in front of a moving device.

As illustrated in FIG. 5, in the case of a conventional art, carpet information C-1 corresponding to the virtual object is displayed by overlapping a surrounding moving device as the real object. That is, conventional augmented reality may not take into account a relationship between the object in the real world and the virtual object, so an overlap may occur.

The image generator 120 may adjust a display size of the carpet information when the carpet information overlaps another object, e.g., the surrounding moving device in the front thereof. In this case, the image generator 120 may generate carpet information C-2 that does not overlap the surrounding moving device based on information related to a location of the surrounding moving device acquired from the auxiliary system 130. Location information of the surrounding moving device may be obtained from the cruise controller for adjusting the speed of the moving device and performing constant speed driving included in the auxiliary system 130, and a magnitude and a display location of the carpet information may be adjusted by using the location information.

In summary, in conventional arrangements, there was a lot of overlap between real and virtual objects, which leads to a sense of heterogeneity, but according to the present exemplary embodiment, it is possible to minimize the heterogeneity of displaying the virtual object by preventing the overlap the real object and the virtual object in consideration of locations thereof. A display location and size of the virtual object may be adjusted by reflecting a location of a front moving device provided by an existing auxiliary system, e.g., a smart cruise controller, without receiving additional information to create such an improved virtual object.

In addition, according to an example, the image generator 120 may display locations of information not related to each other or that are overlapped and displayed in conjunction with each other.

Figure 6:
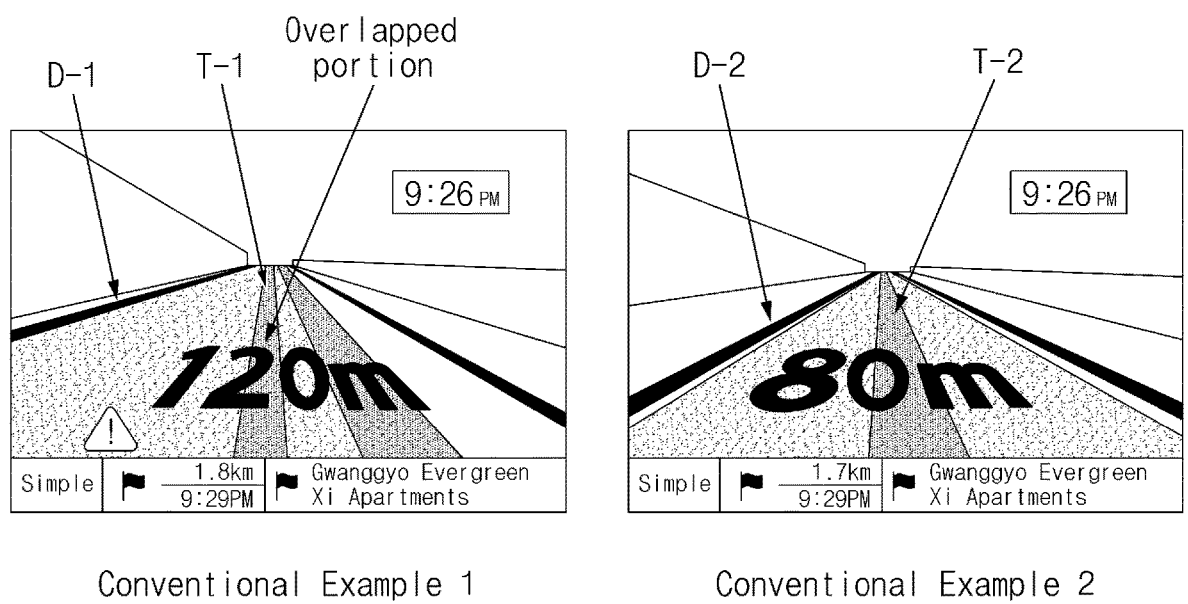
FIG. 6 illustrates a view for describing carpet information and turn-by-turn information according to a prior art of the present disclosure.

FIG. 6 illustrates a view for describing carpet information and turn-by-turn information according to a prior art of the present disclosure.

As in Conventional Example 1 and Conventional Example 2, Carpet information D-1 and turn-by-turn (TBT) information T-1 for guiding a rotational movement of the moving device are overlapped and displayed, and even when the moving device is moved (from Conventional Example 1 and Conventional Example 2), the display locations may not be interconnected with each other, causing irregular overlap (D-2 and T-2). The user cannot intuitively visualize operation information of the moving device due to an irregularly overlapped portion.

On the other hand, when one object moves by connecting locations of two or more types of display information (carpet information and turn-by-turn information) are connected to each other, the image generator 120 according to the present exemplary embodiment may allow another object to move in a same direction or to move according to a predefined mathematical relationship. That is, the image generator 120 may display the turn-by-turn information and the carpet information generated to guide a rotational movement of the moving device in conjunction with a driving road of the moving device, and may change a location depending on a driving lane of the moving device.

FIG. 7 illustrates a view for describing carpet information and turn-by-turn information according to an exemplary embodiment of the present disclosure.

As illustrated in FIG. 7, the carpet information and turn-by-turn information are displayed depending on a driving lane of a moving device without being overlapped, and when the moving device driving at a specific lane as in Example 1 changes a lane as in Example 2, the carpet information and turn-by-turn information are displayed in conjunction with the lane change. That is, the image generator 120 may secure visibility by interconnecting display locations of the carpet information and the turn-by-turn information.

In summary, in conventional arrangements, locations of the display information have been partially determined or their interconnected locations are not defined, so it may sometimes overlap or may be displayed with poor visibility, but visibility is improved by moving proportionally predefined objects in conjunction with locations thereof, or by moving them depending on predefined equations according to the present exemplary embodiment.

In addition, the image generator 120 according to an example may display a real object by expanding it to another type of object, or emphasizing the real object and transforming or expanding it into another type of object.

FIG. 8 illustrates a virtual object related to a road lane according to an exemplary embodiment of the present disclosure.

Example 1 of FIG. 8 shows a virtual object E-1 in which an existing lane is marked with a thicker red surface, and it is possible to emphasize to the user that the moving device cannot move into or enter a corresponding portion through the virtual object E-1.

Alternatively, the image generator 120 may create a virtual object E-2 having a wall form that is not accessible for a lane of a road as shown in Example 2. That is, it is possible to display information of a line in the form of a wall, highlighting the meaning that it is not accessible. Alternatively, when entering another lane without indicating that it is entering outside, the image generator 120 may create the virtual object E-2 having a wall form that it is not accessible for a lane in a corresponding entering direction.

That is, when a situation occurs, such as a lane departure warning, which is performed when a vehicle enters an inaccessible road or when it is accessible but unintentionally changes lanes, the image generator 120 may generate the virtual object having the wall shape with respect to the lane.

Additionally, the image generator 120 may add animation effects to the virtual objects E-1 and E-2 in the form of walls, and sizes or colors, brightness or saturation of the virtual objects E-1 and E-2 in the form of walls may be changed depending on a degree of impossibility of entering the road. That is, a recognition limit of wall images in 2D graphics may be ameliorated by applying an animation effect to virtual objects displayed in the form of walls, and a vertical display limit in 2D graphics may be ameliorated by applying a vertical line when the walls are displayed according to an example. As an animation effect, the virtual object in the form of a wall may be emphasized by flashing or giving a certain shaking. In addition, as described above, the size or color may be different depending on the severity of the warning so that the user can intuitively recognize the severity.

In summary, the conventional virtual object simply highlights a certain object, e.g., changes a color of the same line as that of the lane when warning lane departure, but according to the present exemplary embodiment, a meaning of information may be actively displayed by changing the shape of an existing real object (e.g., a line) to another type of object (e.g., a virtual object in the form of a wall), and a virtual object may be additionally displayed in a form that is easy to recognize 3D information on a 2D screen through an animation or a vertical line effect. Through this, it is possible to maximize recognition improvement of a real object and meaning impartment of a virtual object by extending the real object to another type of object and providing a visual effect.

On the other hand, when displaying a virtual object interconnected to a real object, the image generator 120 may create a reinforcement virtual object that compensates a situation in which the real object cannot be recognized or a situation in which it is not well recognized. The image generator 120 recognizes a real object and displays a virtual object, and when the real object is not recognized or the quality is poor, when there is no device that can recognize the real object, may generate carpet information displayed in a bending form based on steering information obtained through a moving device sensor such as a steering angle sensor.

Figure 9:
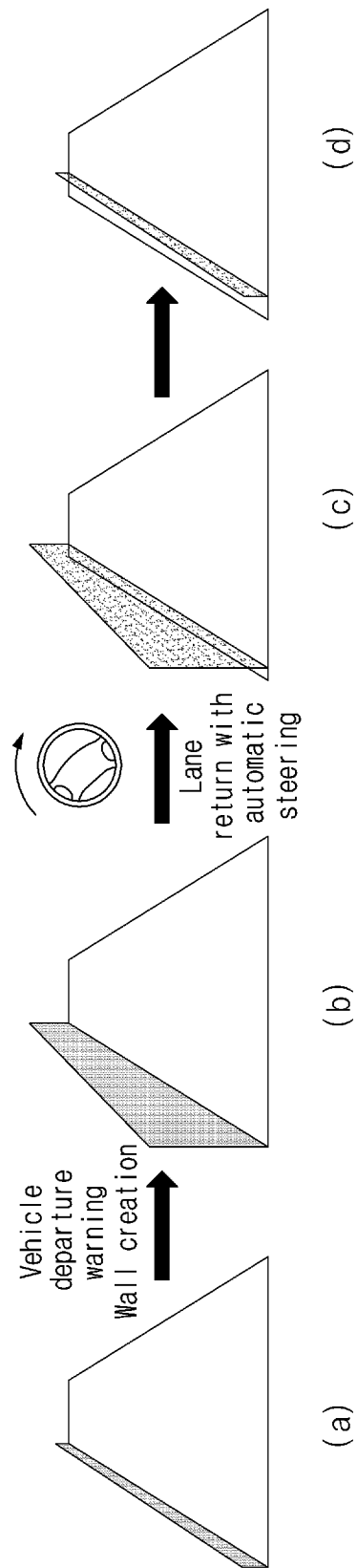
FIG. 9 illustrates a view for describing a virtual form of a wall shape according to an exemplary embodiment of the present disclosure.

FIG. 9 illustrates a view for describing a virtual form of a wall shape according to an exemplary embodiment of the present disclosure.

As shown in FIG. 9, when the moving device deviates from a predetermined lane, a virtual object having a wall form as illustrated in FIG. 8 may be created to warn the deviation.

FIGS. 9 (a) and (b) illustrate that a virtual object having a wall form is created to warn a situation such as lane departure.

When a moving device includes a lane following assist (LFA) system that recognizes a front lane and vehicles and controls a wheel to assist the moving device to maintain a center of the lane, the moving device may be automatically steered, and in this case, the image generator 120 may move the virtual object having the wall form in a direction of the moving device as illustrated in FIG. 9 (c).

That is, when the center of the moving device deviates a predetermined range from a center of a forward path of the moving device, the image generator 120 may create a GUI having a form in which a wall-shaped virtual object pushes a moving device, i.e., a vehicle. Through this, the user may directly sense automatic steering of the moving device, and may be alert for lane maintenance with a feeling that the wall pushes the vehicle.

In this case, a color of a virtual wall in (c) may be different from that in (b). For example, the virtual wall of (b) that warns lane departure may have a red color to include a meaning of the warning, and the virtual wall of (c) may have a green color to signal the release of the warning.

When the vehicle recovers its course and moves to the center of the lane, the image generator 120 may make the generated virtual object disappear again, as illustrated in FIG. 9(d), which may be implemented as opposed to an animation in which a virtual wall is created.

Figure 10:
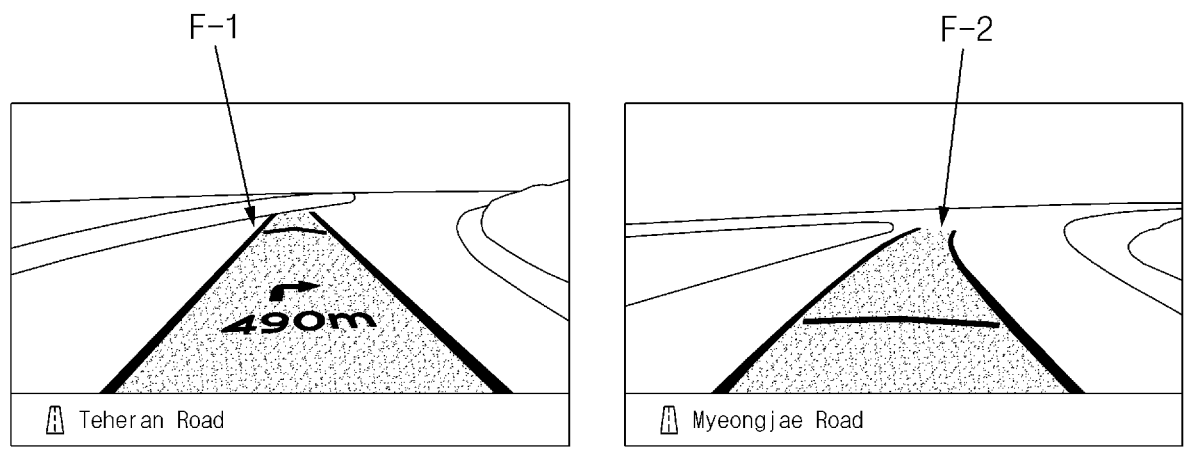
FIG. 10 illustrates a view for describing a reinforcement virtual object according to an exemplary embodiment of the present disclosure.

FIG. 10 illustrates a view for describing a reinforcement virtual object according to an exemplary embodiment of the present disclosure.

As shown, according to the conventional art, there is a case where carpet information F-1 is connected to a central lawn in a center of the road and it is not possible to properly guide it in the forward direction of the moving device. This is because the carpet information (F-1) is not naturally displayed due to a limitation of map accuracy unless a precision map or precise positioning is used, although map information may be used when displaying the forward direction. Alternatively, when lane recognition is used, a similar virtual object cannot be created when there is no lane recognition device, and the carpet information F-1 may be displayed unnaturally or not at all when lane recognition is not intermittently performed depending on a road environment.

To solve this problem, the image generator 120 may create carpet information F-2 capable of compensating a lane as a reinforcement virtual object based on steering angle information obtained from an object recognition device 110, more specifically, a sensor device capable of detecting various states of the moving device. In addition, as an example, when a lane recognition rate of a road on which the moving device is driven does not reach a predetermined threshold, the carpet information F-2 may be created as a reinforcement virtual object.

The carpet information F-2 according to the example of FIG. 10 is guidance information that can display an actual forward direction of the moving device, and smoothly displays the forward direction of the lane. Through this, although a width of the lane is wide, it is an unrecognizable section, but the forward direction of a bending form may be displayed by using the sensor device included in the object recognition device 10, and even when there is no real object or information acquisition device for generating carpet information or recognition of the real object is restricted, a driving direction of the moving device may be displayed by using steering angle data.

Figure 11:
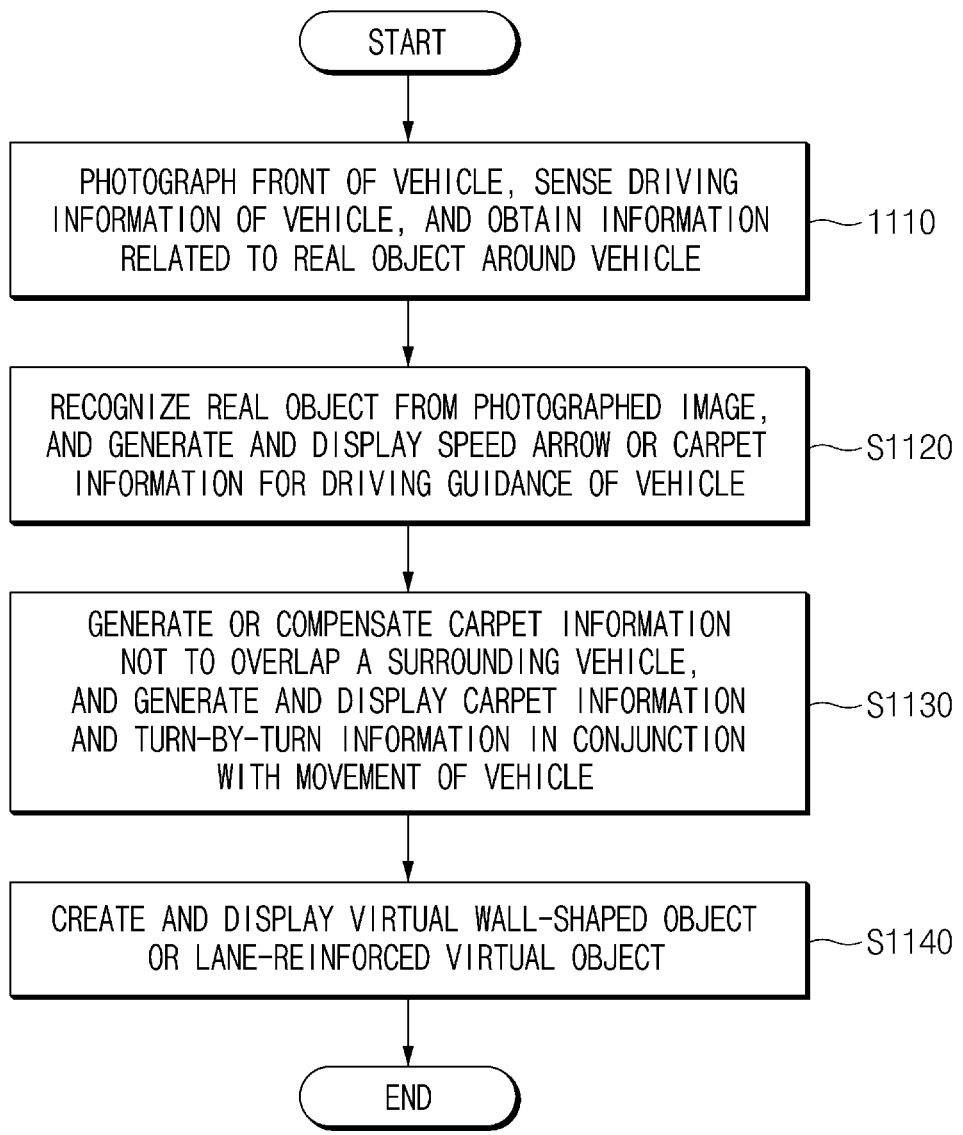
FIG. 11 illustrates a control flowchart for describing a UI generating method for a moving device according to an exemplary embodiment of the present disclosure.

FIG. 11 illustrates a control flowchart for describing a UI generating method for a moving device according to an exemplary embodiment of the present disclosure.

First, a UI generating apparatus may photograph a front of the moving device, may sense driving information of the moving device, and may obtain information related to a real object around the moving device (S1110). The information related to the moving device becomes basic data for generating an augmented real image and composing it into the photographed image.

The image generator 120 of the UI generating apparatus may recognize a real object from the photographed image, and may generate a speed arrow or carpet information for driving guidance of the moving device to display it on the display device 130 (S1120).

Specifically, the image generator 120 may generate a speed arrow whose bending degree is changed based on the speed of the moving device as a virtual object, and the speed arrow may increase the bending degree as the speed increases.

In addition, the image generator 120 may change a bending degree of the speed arrow within a predetermined range of between a maximum angle and a minimum angle, or may adjust a variation of the bending degree based on a magnitude of a variation of the speed. In this case, as the speed variation is smaller, the variation of the bending degree may increase.

In addition, the image generator 120 may generate or compensate carpet information so as not to overlap a surrounding moving device, and may display the created virtual object by generating carpet information and turn-by-turn information in conjunction with a movement of the moving device (S1130).

The image generator 120 may generate carpet information so as not to overlap the surrounding moving device based on information related to a location of the surrounding moving device acquired from the auxiliary system 130.

In addition, when generating turn-by-turn information for guiding rotation operation of the moving device, the image generator 120 may change a display location of the turn-by-turn information in conjunction with a driving road of the moving device.

In addition, the carpet information may also be displayed by changing its location depending on a change of the driving road so that the turn-by-turn information and the carpet information do not overlap irregularly.

The image generator 120 may create a virtual wall-shaped object or, when a lane is not clear, may generate and display a lane-reinforced virtual object (S1140).

The image generator 120 may generate a virtual object having a wall form that is not accessible for a lane in a corresponding entering direction when it enters a lane on a road that is impossible to enter or enters another lane without an entering indicator, and may add an animation effect to the virtual object having the wall form or may change the size or color of the virtual object having the wall form depending on a degree of impossibility to enter, in order to maximize visibility of a user and to increase an warning effect of an inaccessible road.

In addition, the image generator 120 may generate and display carpet information capable of compensating a lane as a reinforcement virtual object based on steering angle information of the moving device.

Steps S1120 to S1140 of FIG. 11 may be independently or sequentially performed, and an order may be changed depending on environment and creation conditions of a created virtual object.

As described above, according to the present disclosure, it is possible to provide a UI generating apparatus and method for intuitively obtaining information on a sense of speed through a GUI that is changed depending on speed interconnection, for ameliorating heterogeneity of a virtual object display by preventing overlapping of other information in consideration of overlapped locations between objects, for displaying locations of information not related to each other or that are overlapped and displayed in conjunction with each other, for maximizing recognition improvement of a real object and meaning impartment of a virtual object by extending an object in the real world to another type of object and giving a visual effect, and for providing a user GUI without awkwardness to display using other information even in a limited situation in recognizing objects in the real world.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A user interface (UI) generating apparatus, comprising:
an object recognition device configured to photograph a front or surroundings of a moving device and to recognize a real object from a photographed image;
an image generator configured to create a virtual object for driving guidance of the moving device and to generate an augmented real image by composing the virtual object with the photographed image; and
a display device configured to display the augmented reality image, wherein the image generator creates a virtual object that is changed in conjunction with a speed of the moving device, and creates a reinforcement virtual object capable of compensating the real object based on characteristics of the real object in the augmented real image.

2. The UI generating apparatus of claim 1, wherein the image generator generates a speed arrow whose bending degree is changed based on a speed of the moving device as the virtual object, and the bending degree of the speed arrow increases as the speed increases.

3. The UI generating apparatus of claim 2, wherein the image generator changes the bending degree within a predetermined range of between a highest angle and a lowest angle.

4. The UI generating apparatus of claim 2, wherein the image generator adjusts a variation of the bending degree based on a magnitude of a variation of the speed, and the variation of the bending degree is increased as the variation of the speed is smaller.

5. The UI generating apparatus of claim 1, wherein the image generator generates carpet information related to a forward direction of the moving device as a virtual object, and generates the carpet information to not overlap a surrounding moving device based on location information of a surrounding moving device obtained from an auxiliary system.

6. The UI generating apparatus of claim 5, wherein the image generator generates turn-by-turn information for guiding a rotation operation of the moving device as a virtual object, and changes display locations of the carpet information and the turn-by-turn information of the moving device.

7. The UI generating apparatus of claim 1, wherein the image generator generates a virtual object having a wall form that it is not accessible for a lane in a corresponding entering direction when it enters a lane on a road that is impossible to enter or enters another lane without an entering indicator.

8. The UI generating apparatus of claim 7, wherein the image generator adds an animation effect to the virtual object having the wall form, and changes a size or color of the virtual object having the wall form depending on a degree of impossibility to enter.

9. The UI generating apparatus of claim 1, wherein the image generator generates a virtual object having a wall form, and moves the virtual object having the wall form in a direction of the moving device when a center of the moving device deviates a predetermined range from a center of a forward path of the moving device.

10. The UI generating apparatus of claim 1, wherein the object recognition device does not change front lane information of the moving device when a speed of the moving device is equal to or less than a predetermined threshold.

11. The UI generating apparatus of claim 1, wherein the image generator generates carpet information capable of compensating a lane based on steering angle information of the moving device as a reinforcement virtual object.

12. A user interface (UI) generating method comprising:
photographing, by an object recognition device, a front or surroundings of a moving device;
recognizing, by the object recognition device, a real object from a photographed image;
creating, by an image generator, a virtual object for driving guidance of the moving device and generating an augmented real image by composing the virtual object with the photographed image; and
displaying, by a display device, the augmented real image,
wherein generating the image includes:
creating a virtual object that is changed in conjunction with a speed of the moving device; and
creating a reinforcement virtual object capable of compensating the real object based on characteristics of the real object in the augmented real image.

13. The UI generating method of claim 12, wherein generating the image includes generating a speed arrow whose bending degree is changed based on a speed of the moving device as the virtual object, and wherein the bending degree of the speed arrow increases as the speed increases.

14. The UI generating method of claim 13, wherein generating the image includes changing the bending degree within a predetermined range of between a highest angle and a lowest angle.

15. The UI generating method of claim 13, wherein generating the image includes adjusting a variation of the bending degree based on a magnitude of a variation of the speed, wherein the variation of the bending degree is increased as the variation of the speed is smaller.

16. The UI generating method of claim 12, wherein generating the image includes:
generating carpet information related to a forward direction of the moving device as a virtual object; and
generating the carpet information to not overlap a surrounding moving device based on location information of a surrounding moving device obtained from an auxiliary system.

17. The UI generating method of claim 16, wherein generating the image includes:
generating turn-by-turn information for guiding a rotation operation of the moving device as a virtual object; and
changing display locations of the carpet information and the turn-by-turn information of the moving device.

18. The UI generating method of claim 12, wherein generating the image includes generating a virtual object having a wall form that it is not accessible for a lane in a corresponding entering direction when it enters a lane on a road that is impossible to enter or enters another lane without an entering indicator.

19. The UI generating method of claim 17, wherein generating the image includes:
adding an animation effect to the virtual object having a wall form; and
changing a size or color of the virtual object having the wall form depending on a degree of impossibility to enter.

20. The UI generating method of claim 12, wherein generating the image includes:
generating a virtual object having a wall form; and
moving the virtual object having the wall form in a direction of the moving device when a center of the moving device deviates a predetermined range from a center of a forward path of the moving device.

21. The UI generating method of claim 12, wherein recognizing the real object includes not changing front lane information of the moving device when a speed of the moving device is equal to or less than a predetermined threshold.

22. The UI generating method of claim 12, wherein generating the image includes generating carpet information capable of compensating a lane based on steering angle information of the moving device as a reinforcement virtual object.

23. A user interface (UI) generating apparatus, comprising:
- an object recognition device configured to recognize a real object from a front or surroundings of a moving device;
- an image generator configured to generate a virtual object for driving guidance of the moving device based on the recognized real object, and to generate an augmented real image including the virtual object; and
- a display device configured to display the augmented reality image,
- wherein the image generator creates a virtual object that is changed in conjunction with a speed of the moving device, and creates a reinforcement virtual object based on characteristics of the real object in the augmented real image, and
- wherein the display device includes a transparent display area.

24. A user interface (UI) generating method comprising:
- recognizing, by an object recognition device, a real object from a front or surroundings of a moving device;
- generating, by an image generator, a virtual object for driving guidance of the moving device based on the recognized real object, and to generate an augmented real image including the virtual object;
- displaying, by a display device, the augmented real image on a display device including a transparent display area;
- wherein generating the image includes:
- creating a virtual object that is changed in conjunction with a speed of the moving device; and
- creating a reinforcement virtual object based on characteristics of the real object in the augmented real image.

* * * * *